UNITED STATES PATENT OFFICE.

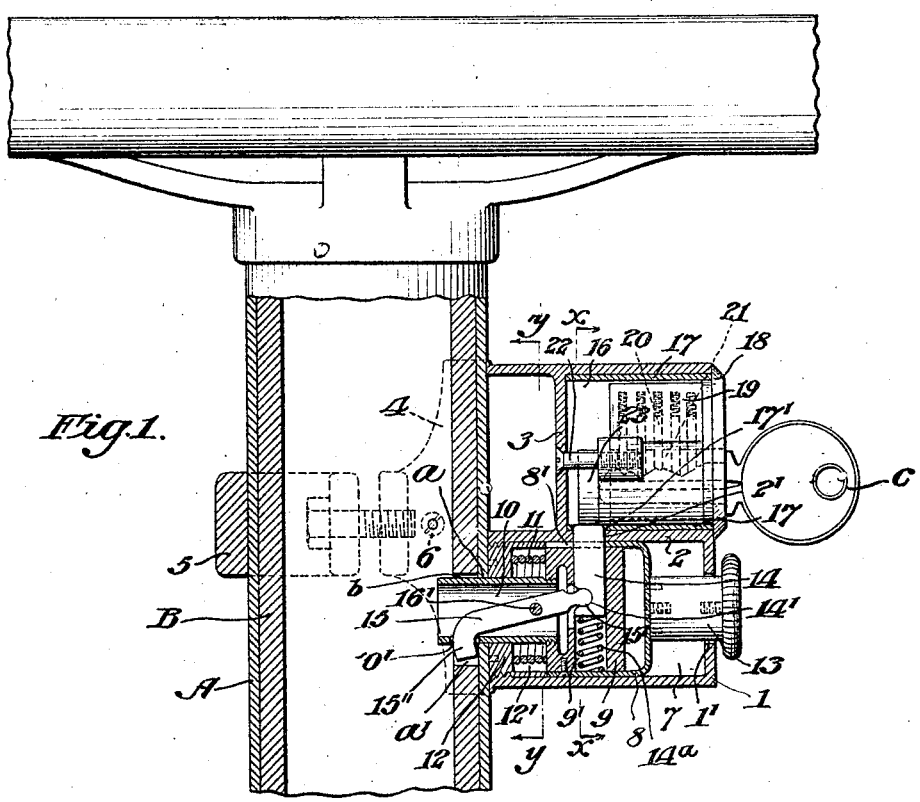

EDWARD ROBINS GLENN, OF PHILADELPHIA, AND CHARLES C. BEHNEY, OF SHARON HILL, PENNSYLVANIA.

LOCK.

1,095,569.  Specification of Letters Patent.  Patented May 5, 1914.

Application filed July 3, 1913. Serial No. 777,354.

*To all whom it may concern:*

Be it known that we, EDWARD R. GLENN and CHARLES C. BEHNEY, citizens of the United States, residing, respectively, at Philadelphia, Philadelphia county, Pennsylvania, and at Sharon Hill, Delaware county, Pennsylvania, have jointly invented certain Improvements in Locks, of which the following is a specification.

Our invention is an improved lock particularly designed for securely fixing the steering mechanism of automobiles by means that cannot be detached readily, though it will be understood that it is of more general application.

In its preferred form, it comprises the combination with a movable part and a fixed part of a steering mechanism, of a lock having a casing fixed to one of said parts and means comprising a bolt adapted for engagement with the other of said parts and a hook or latch for preventing the withdrawal of the bolt as by cutting the lock case fastening or otherwise than by the key. The construction is such that the bolt is normally maintained in the retracted position but is provided with means whereby it can be shot without the use of a key, the latching mechanism securing the bolt when shot so that it can be retracted only by the use of a key.

The characteristic features of a lock embodying our improvements are illustrated in the accompanying drawings and the following description in illustration thereof.

In the drawings, Figure 1 is a sectional elevation of a lock embodying our improvements applied to the steering mechanism of a motor vehicle; Fig. 2 is a transverse sectional view on the line x—x of Fig. 1; and Fig. 3 is a transverse sectional view on the line y—y of Fig. 1.

As shown in the drawings, a lock casing 1, containing the webs or walls 2 and 3 and having thereon the collar sections 4, is clamped on the steering shaft casing A by bolting the respective collar sections to the band 5; screws 6 passing through the collar sections into the shaft casing to prevent the movement of the lock casing.

The compartment 7, formed within the lock casing by the walls 1 and 2, has therein reciprocating mechanism comprising a shell or thimble 8 (preferably of hardened metal) provided with a slot 8′ and containing a bearing member 9 to which is fixed a bolt 10. The reciprocating mechanism is normally held in the retracted position by a spring 11 disposed between the bearing member 9 and a bushing 12 screwed into the casing, the bushing containing the recess or socket 12′ for the spring. A push button 13 passes through an aperture 1′ in the casing 1 and is fixed to the shell 8, whereby the reciprocating mechanism can be pushed in against the action of the spring 11.

The bearing member 9 has therein a way 9′, registering with the slot 8′, in which is disposed a bolt 14 containing a cylindrical socket or journal bearing 14′. A spring 14ᵃ is disposed in the way 9′ between the shell 8 and the bolt 14, the spring acting to throw the bolt into the aperture 2′ in the wall 2 when the reciprocating mechanism is pushed in so that such bolt and aperture are in registration. A latch 15 is provided with an end 15′ journaled in the bearing 14′ and is fulcrumed by the bearing pin 16′ in the bolt 10, the latch having a laterally projecting part 15″ adapted to move through the aperture 10′ of the bolt 10.

The compartment 16, formed within the lock casing by the walls 2 and 3, has fixed therein a shell 17 provided with an aperture 17′ in registration with the aperture 2′ and containing locking mechanism, preferably of the Yale type, comprising the face plate 18, tumbler box 19 fixed thereto, tumblers 20 in the box, and a revoluble barrel 21 controlled by the tumblers, the box 19 being fixed in position by a screw 22 passing through the wall 3. A cam 23 is fixed to the barrel 21 and engages the bolt 14, the cam being adapted to move the bolt back against the action of the spring 14ᵃ.

The tubular casing A for the steering shaft B contains an aperture *a* through which the bolt 10 is adapted to pass and the steering shaft B contains the aperture *b* adapted to register with the aperture *a* and to receive the bolt 10, the aperture *a* being provided with a notch *a*′ adapted for receiving the hook 15″.

When it is desired to lock the steering mechanism, the aperture *b* is brought into registration with the aperture *a*, the push button 13 is thrust in, the bolt 10 is thrust through the registering apertures, the spring 14ᵃ throws the bolt 14 into the apertures 2′ and the latch 15 is thrown thereby so that its hook 15″ lies in the notch *a*′ in locking engagement with the casing A, the cam 23 being in its position withdrawn from the bolt 14 as illustrated in Fig. 2 and the plungers 20 being engaged in the box or cylinder 19 in which the barrel 21 revolves. When it is desired to unlock the mechanism, the key C is inserted and turned, thereby withdrawing the tumblers and revolving the barrel and the cam, the cam retracting the bolt 14 and the latch 15 and the spring 11 retracting the bearing 9 and the bolt 10, so that the shaft B can be turned in the casing A.

Having described our invention, we claim:

1. A lock having a casing, a bolt and a latch connected within said casing, and means comprising transversely acting springs for reciprocating said bolt and oscillating said latch.

2. A lock comprising a casing containing a reciprocating bolt, a fulcrumed latch connected so as to be movable therewith, and a second bolt reciprocating transversely to said first named bolt whereby said latch is rocked.

3. A lock having a casing, reciprocating bolts, means adapted to be engaged by one of said bolts to hold the other thereof, and a latch connected and movable with each of said bolts.

4. A lock having a casing, mechanism comprising a bolt having a bearing movable in said casing, a push button extending through said casing whereby said bearing is movable, a spring for retracting said bearing and bolt, a fulcrumed latch movable with said bolt, and means for locking said latch.

5. A lock having a reciprocating mechanism comprising a bolt and a way, a bolt movable in said way, a latch fulcrumed on said mechanism and connected with said second named bolt, in combination with a movable member containing a socket for said bolt first named and a socket for said latch, and means comprising a cam for moving said second bolt to retract said latch from its socket.

6. A lock comprising a casing containing a reciprocating bearing, a fulcrumed latch connected therewith, a reciprocating bolt connected with said bearing and latch, a spring for moving said bearing, a spring for moving said bolt and rocking said latch, and key operated mechanism for moving said bolt against the action of its spring and rocking said latch.

7. A locking mechanism comprising a casing containing a way, a bearing adapted to reciprocate in said way, a lever provided with a hook fulcrumed relatively to and movable with said bearing and means comprising a key operated device for throwing and locking said lever, in combination with a steering mechanism comprising a movable and a fixed part to one of which said casing is fixed, through which said hook extends and with which it is adapted to engage.

8. A locking mechanism comprising a casing containing a way, a bearing adapted to reciprocate in said way, a lever provided with a hook fulcrumed relatively to and movable with said bearing, and key operated mechanism whereby said lever is thrown and locked, in combination with a steering mechanism comprising a tubular casing to which said casing first named is fixed, said tubular casing containing an aperture through which said hook is adapted to extend to effect an engagement therewith, and a revoluble shaft in said tubular casing, said shaft containing a recess in which said hook is adapted to engage.

9. The combination with a steering mechanism comprising a casing containing an aperture and a shaft revoluble in said casing, said shaft containing a recess adapted to register with said aperture, of a locking mechanism comprising a casing having means connected therewith whereby it is fixed on said casing first named, means comprising a bearing movable in said second casing and a bolt fixed thereto, said bolt being movable through said aperture into said recess, a lever having a hook fulcrumed relatively to said means and adapted to pass through said aperture into said recess, said hook being adapted for engaging said casing first named, and key operated means for locking said bolt and hook in said recess with said hook in position for engaging said casing first named.

In testimony whereof we have hereunto set our names this 28th day of June, 1913, in the presence of the subscribing witnesses.

EDW. ROBINS GLENN.
CHARLES C. BEHNEY.

Witnesses:
H. G. FLOMERFELT,
WILLIS F. HARRISON.